Sept. 24, 1963 R. S. SILVER ETAL 3,105,020
METHOD AND APPARATUS FOR THE MULTISTAGE
FLASH DISTILLATION OF A LIQUID
Filed Sept. 19, 1958
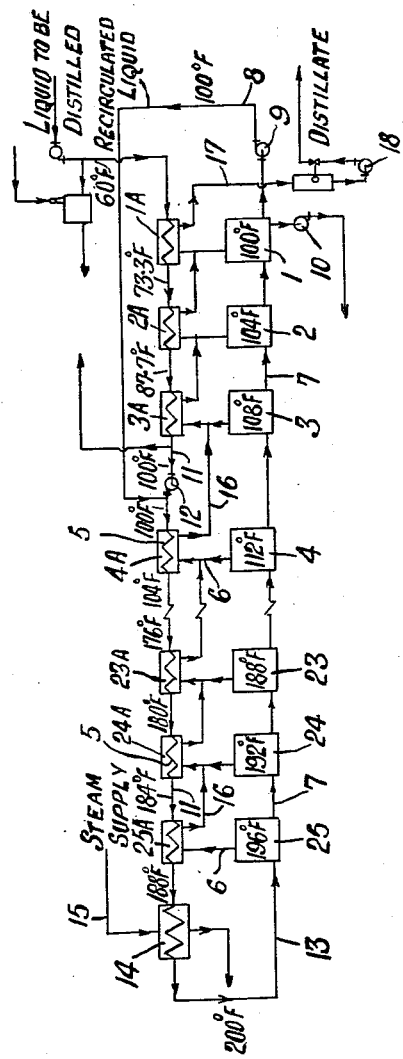

3,105,020
METHOD AND APPARATUS FOR THE MULTI-STAGE FLASH DISTILLATION OF A LIQUID

Robert S. Silver and James R. Herd, Cathcart, Glasgow, Scotland, assignors to G. & J. Weir Limited, Glasgow, Scotland, a corporation of Great Britain and Northern Ireland
Filed Sept. 19, 1958, Ser. No. 762,179
Claims priority, application Great Britain, Sept. 21, 1957
2 Claims. (Cl. 202—53)

This invention relates to an improved multiple-stage evaporator of the type in which liquid at saturation temperature corresponding to the pressure in the chamber (hereinafter referred to as "flash chamber") of one stage flows to the flash chamber of a further stage at a lower pressure and arrives in said further stage at a temperature higher than the saturation temperature corresponding to the lower pressure so that a portion of the liquid flashes into vapour which is led off to condensing means where the vapour is obtained as a liquid distillate.

It is to be understood that, in an evaporator of the type referred to, there is a vapour system in which vapour is condensed and flows as a distillate in one direction through a plurality of stages and a liquid system in which feed liquid, which may be brine, flows together with recirculated liquid in the opposite direction through a plurality of stages. In the following description, we enumerate the stages in accordance with the sequence of heating liquid flowing through the system, the first stage being that in which feed liquid flowing through the system is first heated by vapour from the vapour system and the last stage being that in which the feed liquid, after flowing through a plurality of stages in series with the first stage, is finally heated by vapour from the vapour system.

The primary object of the present invention is to provide for a reduction in the heating surface required in each stage for a given make of distillate.

In an evaporator, of the type referred to, the provision of a plurality of stages for flash of liquid into vapour permits an economy in the amount of heat to be supplied to the evaporator. Such an economy is defined usually in terms of the "performance ratio" of the evaporator which, in an evaporator producing distilled water and using steam as the primary source of heat, is the ratio of the number of pounds of distillate produced to the number of pounds of steam used.

In an evaporator, of the type referred to, according to the invention we provide a plurality of stages the number of which is an integer greater than at least twice the performance ratio of the evaporator, and means for feeding intake feed liquid without recirculated liquid through the stage at the lowest temperature and in turn through several stages in series with the last-mentioned stage until the temperature of the intake feed liquid is the same as or greater than the arithmetic mean of the original temperature of the feed liquid and the temperature of liquid to be recirculated through the evaporator, which last-mentioned liquid is then mixed with the feed liquid.

One embodiment of multiple-stage evaporator of the type referred to, according to the invention is illustrated in the accompanying flow diagram in which is shown an evaporator having a performance ratio of 8.34 and provided with twenty five stages of which only stages one to four and stages twenty three and twenty five have been illustrated for clarity.

Referring to the diagram, 1, 2, 3, 4, 23, 24 and 25 denote, respectively, the flash chambers of the first four stages and of the last three stages. 1A, 2A, 3A, 4A, 23A, 24A and 25A denote vapour chambers, respectively associated with the flash chambers each including a heater, denoted generally by 5, presenting a heating surface for heating by vapour of feed liquid, such as brine, or/and of liquid being recirculated through the stages and flowing through the heater.

In operation of the system, vapour condensed in each vapour chamber flows as a distillate in the direction from the vapour chamber 25A to the chamber 1A and feed liquid flows in the opposite direction through the heater 5 in the vapour chamber 1A to the heater 5 in the vapour chamber 25A and thence to the flash chamber 25.

Each flash chamber 25 to 1 is connected by a duct 6 to its associated vapour chamber and each chamber 25 to 2 is connected by a duct 7 to its succeeding chamber. The chamber 1 is connected by a duct 8 in which is intercalated a pump 9 to a duct between the heaters in the vapour chambers 3A and 4A. A pump 10 for blowdown of liquid from the flash chamber 1 is connected to the chamber 1. The heater 5 in each of the vapour chambers 2A to 25A is connected by a duct 11 to the heater in the preceding vapour chamber. A booster pump 12 is intercalated in the duct between the chambers 3A and 4A. The heater 5 in the vapour chamber 25A is also connected by a duct 13 to the flash chamber 25. A heater 14, fed with steam by way of a duct 15 from a source of supply of steam, is intercalated in the duct 13 to heat liquid leaving the heater in the chamber 25A to a temperature of 200° F. Each vapour chamber 25A to 2A is connected to its succeeding vapour chamber by a duct 16 for flow of distillate through the chambers. The vapour chamber 1A is connected by a duct 17 to a pump 18 for extraction of the complete distillate from the evaporator.

In the evaporator shown in the diagram, the temperature of vapour in the interior of the flash chamber 1 is 100° F., so that the temperature of the liquid to be recirculated is also 100° F. The temperature of the intake feed liquid is 60° F., so that the arithmetic mean of the temperature of the intake feed liquid and of the liquid to be recirculated is 80° F. and it is necessary in accordance with the invention to raise the temperature of the feed liquid, before being mixed with recirculated liquid, to a temperature the same as or greater than 80° F. by feeding the intake feed liquid without recirculated liquid through the first three stages, the temperature of the vapour being 100° F. in the vapour chamber 1A, 104° F. in the vapour chamber 2A and 108° F. in the vapour chamber 3A. The temperature of the feed liquid during its passage through the heaters 5 in the vapour chambers 1A, 2A and 3A is raised from 60° F. to 100° F. This temperature is greater than the arithmetic mean of the original temperature of the feed liquid and of the liquid to be recirculated. Liquid to be recirculated is then mixed in the duct 11 between the heaters in the vapour chambers 3A and 4A with the feed liquid and the mixture passes through the heaters of the remaining twenty two stages.

It will be understood that the number of stages through which the feed liquid flows without recirculated liquid depends on the quantity of feed liquid supplied and on the quantity of vapour in each stage.

When the heated mixture flows through the flash chambers of the stages, liquid at a saturation temperature corresponding to the pressure in the flash chamber, for example, 25 of one stage flows through the duct 7 to the flash chamber 24 of the succeeding stage at a lower temperature and arrives in the chamber 24 at a temperature higher than the saturation temperature corresponding to the lower pressure in said chamber 24, so that a portion of the liquid flashes into vapour which flows through the duct 6 to the vapour chamber 24A where the vapour heats liquid flowing through the associated heater 5, is condensed and flows as liquid distillate through the duct 16 to the succeeding vapour chamber 23A.

We claim:

1. In a multiple-stage evaporator for evaporating a liquid feed including a plurality of stages in series operated at progressively higher pressures and temperatures in one direction, in which each stage includes a flash chamber and a condensing means associated with the flash chamber for condensing the vapors flashed in the flash chamber, the improvement in which the stages are so interrelated that feed liquid at saturation temperature corresponding to the pressure in the flash chamber of one stage flows to the flash chamber of the next stage at a lower pressure and arrives in said next stage at a temperature higher than the saturation temperature corresponding to said lower pressure so that a portion of the feed liquid flashes into vapor which is led off to the condensing means for said stage, means for conducting intake feed liquid through the condensing means of the series of stages in heat exchange with the vapors therein in a direction to heat the feed liquid to progressively higher temperatures, means for conducting the heated feed liquid from the last condensing means of the series of stages into the flash chamber associated therewith and for conducting feed liquid therefrom in succession through the remaining flash chambers of the series of stages in a direction opposite to the direction of flow of the intake feed liquid through the condensing means of the series of stages, said feed liquid being conducted at a point in its flow through the series of stages from one condensing means to the next condensing means at a temperature about equal to the temperature of the unvaporized feed liquid at the last flash chamber of the series of stages, means for conducting feed liquid unvaporized in said series of stages from the last flash chamber of the series of stages and for mixing the feed liquid conducted from said last flash chamber with the intake feed liquid passing through the condensing means of the series of stages at said point in the series of stages where the temperature of the intake feed liquid is about equal to the temperature of the unvaporized feed liquid conducted from said last flash chamber.

2. In the method of evaporating liquids in and operating a multiple-stage evaporator including a plurality of stages in series in which each stage includes a flash zone and a condensing zone associated with the flash zone for condensing the vapors flashed in the flash zone, maintaining the flash zones at progressively higher pressures and temperatures in one direction through the series of stages, the stages being so interrelated that feed liquid at saturation temperature corresponding to the pressure in the flash zone of one stage flows to the flash zone of the next stage at a lower pressure and arrives in said next stage at a temperature higher than the saturation temperature corresponding to said lower pressure so that a portion of the feed liquid flashes into vapor which is led off to the condensing zone for said stage, conducting intake feed liquid to be evaporated through the condensing zones of the series of stages in heat exchange with but out of contact with the vapors therein in a direction to heat the intake feed liquid to progressively higher temperatures, conducting the heated feed liquid from the condensing zone of highest temperature into the flash zone associated therewith and conducting feed liquid therefrom in succession through the remaining flash zones of the series of stages in a direction opposite to the direction of flow of the intake feed liquid through the condensing zones of the series of stages, said feed liquid being conducted at a point in its flow through the plurality of stages from one condensing zone to the next condensing zone at a temperature about equal to the temperature of the unvaporized feed liquid at the flash zone of lowest temperature in the series of stages, withdrawing feed liquid from the flash zone of lowest temperature in the series of stages and mixing feed liquid withdrawing from said flash zone with the intake feed liquid passing through the condensing zones of the series of stages at said point where the temperature of the intake feed liquid is about equal to the temperature of the liquid withdrawn from said flash zone of lowest temperature, the withdrawn feed liquid being recirculated through a plurality of the condensing zones and then through the flash zones of the stages after being mixed with the intake feed liquid, and the intake feed liquid being conducted through several of the condensing zones of the series of stages without recirculated liquid until it is heated to a temperature about equal to the temperature of the liquid withdrawn from said flash zone of lowest temperature.

References Cited in the file of this patent

UNITED STATES PATENTS

| | | |
|---|---|---|
| 585,365 | Skiffington | June 29, 1897 |
| 643,702 | Waterhouse | Feb. 20, 1900 |
| 2,537,259 | Cleaver et al. | Jan. 9, 1951 |
| 2,759,882 | Worthen et al. | Aug. 21, 1956 |
| 2,894,879 | Hickman | July 14, 1959 |
| 2,908,618 | Bethon | Oct. 13, 1959 |
| 2,959,524 | Goeldner | Nov. 8, 1960 |

OTHER REFERENCES

Chem. Eng., October 1956 (pages 126 and 128 relied on).